(12) United States Patent
Tsai et al.

(10) Patent No.: US 11,942,795 B1
(45) Date of Patent: Mar. 26, 2024

(54) MULTI-ANTENNA SYSTEM FOR HARVESTING ENERGY AND TRANSMITTING DATA

(71) Applicant: NETRONIX, INC., Jubei (TW)

(72) Inventors: Fang Ming Tsai, Jubei (TW); You Wei Zhang, Jubei (TW); Jun Sheng Lin, Jubei (TW)

(73) Assignee: Netronix, Inc., Jubei (TW)

( * ) Notice: Subject to any disclaimer, the term of this patent is extended or adjusted under 35 U.S.C. 154(b) by 0 days.

(21) Appl. No.: 18/059,023

(22) Filed: Nov. 28, 2022

(51) Int. Cl.
*H02J 50/20* (2016.01)
*H01Q 5/371* (2015.01)

(52) U.S. Cl.
CPC ............. *H02J 50/20* (2016.02); *H01Q 5/371* (2015.01)

(58) Field of Classification Search
CPC ........ B60L 5/005; B60L 53/12; B60L 53/122; B60L 53/124; B60L 53/126; H01F 27/006; H01F 38/14; H02G 7/16; H02J 5/00; H02J 5/005; H02J 7/00; H02J 7/0042; H02J 7/0044; H02J 7/0045; H02J 7/025; H02J 17/00; H02J 50/00; H02J 50/001; H02J 50/005; H02J 50/05; H02J 50/10; H02J 50/12; H02J 50/15; H02J 50/20; H02J 50/23; H02J 50/27; H02J 50/30; H02J 50/40; H02J 50/402; H02J 50/50; H02J 50/502; H02J 50/60; H02J 50/70; H02J 50/80; H02J 50/90; H04B 5/0037; Y02T 90/12
USPC ...................................................... 307/104
See application file for complete search history.

(56) References Cited

U.S. PATENT DOCUMENTS

| 9,319,091 | B2 | 4/2016 | Kihara |
| 10,097,234 | B2 | 10/2018 | He et al. |
| 11,381,110 | B1 | 7/2022 | Tanaka et al. |
| 2009/0009007 | A1 | 1/2009 | Kato et al. |
| 2014/0085002 | A1 | 3/2014 | Anderson et al. |
| 2019/0386556 | A1* | 12/2019 | Liu .................... H03H 7/38 |
| 2020/0119585 | A1* | 4/2020 | Rodrigues Mansano .................... G01R 27/2605 |

(Continued)

FOREIGN PATENT DOCUMENTS

EP 3916956 A1 12/2021

OTHER PUBLICATIONS

Office Action mailed to Taiwanese Counterpart Patent Application No. 111145353 dated Nov. 21, 2023.

*Primary Examiner* — Quan Tra
(74) *Attorney, Agent, or Firm* — Rosenberg, Klein & Lee

(57) ABSTRACT

A multi-antenna system for harvesting energy and transmitting data includes an energy storing unit, antenna transmission units, and a load unit. Each antenna transmission unit includes an antenna module, a splitting module, an energy generation module, and a data processing module. The splitting module splits a wireless signal received by the antenna module into a first splitting signal and a second splitting signal and transmits the first splitting signal to an energy generation module to convert the first splitting signal into electrical energy stored in an energy storing unit and provided to the data processing module. The energy storing unit provides the electrical energy for the load unit. The data processing module receives one of the second splitting signals, converts it into a control signal, and transmits the control signal to the load unit. The load unit operates according to the control signal.

8 Claims, 3 Drawing Sheets

(56) References Cited

U.S. PATENT DOCUMENTS

2022/0209583 A1\* 6/2022 Pan .................. H02J 50/20
2022/0317276 A1\* 10/2022 Mitsumoto ........... G01S 13/584

\* cited by examiner

MULTI-ANTENNA SYSTEM FOR HARVESTING ENERGY AND TRANSMITTING DATA

BACKGROUND OF THE INVENTION

Field of the Invention

The present invention relates to a multi-antenna system, particularly to a multi-antenna system for harvesting energy and transmitting data.

Description of the Related Art

The electrophoretic electronic ink technology includes microcapsule electro phoretic displays, microcup electro phoretic displays, quick-response liquid powder displays (QR-LPDs), and in-plane electro phoretic displays (IP-EPDs).

No matter what kind of electrophoretic electronic ink technology, it depends on the movement of electric ions in the transparent or colored liquid. In the electric field, the charged particles move toward the electrodes whose polarities opposite to the polarities of the particles. The microparticles are turned or flowed to brighten or dim pixels. The electronic ink can be fabricated on glass, metal or plastic substrates. Then, the thin film transistor circuit is formed. The driver IC controls the electronic ink to form the pixel patter, thereby fabricating an electronic paper display (EPD).

An electronic paper display is a display device with a visual effect similar to that of paper, which has two characteristics of reflection and bistability. The reflective electronic paper display, like ordinary paper, needs an external light source to see the picture through reflection. Thus, the reflective electronic paper display can be read outdoors, and the picture does not flicker after imaging. The eyes are less tired when reading for a long time. The bistable electronic paper display only consumes power when it is driven. The static image displayed after imaging does not consume power until the displayed picture is updated next time. Therefore, the electronic paper display consumes less power than other displays. For the foregoing reasons, electronic paper displays are currently mainly applied to products such as e-book readers, electronic signboards, credit cards, membership cards, clocks, e-paper labels, digital photo frames, or mobile phones.

The battery-free electronic paper tags have been developed in recent years. For example, battery-free electronic paper tags receive wireless signals and absorb energy in a short period of time using a wireless charging method. The energy is stored in the energy storing capacitor. Then, the data is updated and stored in a low power consumption method. Take Japanese Patent Publication No. JP2021033222A (whose title of invention: Control Method of Information Display Device, Display Control Device and Electronic Paper Display device, hereinafter "reference 1") as an example. Its abstract stated the description of "An information display device includes a display that displays information, a communication unit that contactlessly communicates with an information communication medium, a communication control unit including a transceiver and a power converter such that the transceiver receives the display information from the information communication medium through the communication unit and that the power converter converts an electromagnetic wave received by the communication unit into electric power, and a display control unit including a storage, a voltage monitor, and a display driver such that the storage stores the display information received by the transceiver, that the voltage monitor monitors a voltage of electric power supplied from the power converter, and that the display driver updates, based on the display information stored in the storage, the information displayed on the display".

However, the biggest difficulty of electronic paper tags is how to harvest and store the energy of wireless signals in a short period of time. The battery-free electronic paper tag or other similar battery-free products have this problem. Thus, there are many people to improve this problem. The main method is to use multiple energy harvesting antennas to harvest the energy of wireless signals at the same time. Take Taiwan Invention Patent No. 1759794 (whose title of invention: Internet of Things Wireless Charging Sensor, hereinafter "reference 2"). Its abstract stated the description of "An IoT wireless power transfer sensor is provided, which includes a sensor circuit, a group of retrodirective searching antennas, a group of energy harvesting antennas and a communication antenna. The sensor circuit includes a switching unit, an energy converting unit, a power management unit and an energy converting and storage unit. The searching antennas are connected to the switching unit. When the switching unit is on, the searching antennas don't harvest the energy of an external device's scanning signal; they reflect the incident energy to the external device. The energy harvesting antenna is connected to the energy converting unit and receives the incident energy to charge the energy converting and storage unit".

Reference 1 has the following problems. When multiple sets of antennas are used to harvest energy and receive information of wireless signals at the same time, the energy cannot be used directly since the energy harvested by each set of antennas is different. The information sent by the communication component and received by the multiple sets of antennas will interfere with each other. In addition, reference 2 has the following problems. The retrodirective searching antennas sense the energy of the scanning signal rather than harvest the energy of the incident signal at the same time. The energy harvesting antennas receive the energy of the incident signal rather than the data of the incident signal. The communication antenna can communicate with other IoT devices only when the communication module enters into the communication mode. Therefore, how to enable battery-free electronic paper labels or other battery-free electronic products to employ multiple sets of antennas for simultaneously harvesting energy and transmitting information is an urgent problem to be solved.

SUMMARY OF THE INVENTION

In view of the problems of the prior art, the objective of the present invention is that a battery-free product in multi-antenna architecture can simultaneously harvest the energy of a wireless signal and receive control information attached to the wireless signal, and enable a load to receive the energy to process the control information.

The present invention provides a multi-antenna system for harvesting energy and transmitting data, which includes an energy storing unit, a plurality of antenna transmission units, and a load unit. The antenna transmission units are coupled to the energy storing unit. Each antenna transmission unit includes an antenna module, a splitting module, an energy generation module, and a data processing module. The antenna module is configured to receive a wireless signal from a source terminal. The splitting module is coupled to the antenna module and configured to receive the wireless signal and split the wireless signal into a first splitting signal and a second splitting signal. The energy generation module is coupled to the splitting module. The energy generation module is configured to receive the first splitting signal, convert the first splitting signal into electrical energy, and transmit the electrical energy to the energy storing unit to store the electrical energy in the energy storing unit. The data processing module is coupled to the splitting module and the energy generation module and configured to receive the electrical energy to receive the second splitting signal. The data processing module is configured to convert the second splitting signal into a control signal. The load unit is coupled to the energy storing unit and the corresponding data processing module of one of the plurality of antenna transmission units and configured to harvest the electrical energy from the energy storing unit and receive the control signal from the corresponding data processing module. The load unit is configured to operate according to the control signal.

In an embodiment of the present invention, the energy generation module includes an energy conversion portion and an energy adjustment portion. The energy conversion portion is configured to covert the first splitting signal into basic electrical energy. The energy adjustment portion is coupled to the energy conversion portion and configured to covert the basic electrical energy into different voltages as select energy.

In an embodiment of the present invention, the data processing module includes a main control portion and a data transmission portion. The main control portion is coupled to splitting module and configured to the second splitting signal. The main control portion is configured to process the second splitting signal to generate the control signal. The data transmission portion is coupled to the main control portion and configured to receive the control signal. The data memory portion is coupled to the main control portion and the data transmission portion and configured to store data transmitted and processed by the main control portion and the data transmission portion. The load unit is coupled to the data transmission portion of the corresponding data processing module.

In an embodiment of the present invention, the main control portion includes a demodulator, a tuner, a command decoder, and a clock generator. The demodulator is coupled to the splitting module and configured to receive the second splitting module. The demodulator is configured to demodulate the second splitting module into a demodulation signal. The tuner is coupled to the data transmission portion. The demodulator is configured to receive output data outputted by the data transmission portion, tune the output data into an output signal and transmit the output signal to the splitting module. The splitting module is configured to transmit the output signal to the antenna module, thereby transmitting the output signal to the source terminal. The command decoder is coupled to demodulator and configured to receive the demodulation signal. The command decoder is configured to decode the demodulation signal to generate a control command, process the control command to generate the control signal, and transmit the control signal to the data transmission portion. The clock generator is coupled to the demodulator, the tuner, and the command decoder and configured to generate a clock signal required by the demodulator, the tuner, and the command decoder.

In an embodiment of the present invention, the data transmission portion is a serial peripheral interface, an internal integrated circuit bus or a system management bus.

In an embodiment of the present invention, the splitting module is a balanced to unbalanced converter.

In an embodiment of the present invention, the antenna module is a single-frequency antenna or a multi-frequency antenna.

In an embodiment of the present invention, the reception frequency band and the transmission frequency band of the antenna module range from 3 MHz to 7.15 GHz.

In an embodiment of the present invention, the energy storing unit is an energy storing capacitor.

In an embodiment of the present invention, the load unit is a battery-free e-paper label.

To sum up, the present invention can simultaneously employ multiple antennas to receive the wireless signal and employ the splitting module to convert the wireless signal into the first splitting signal and the second splitting signal. The energy generation receives the first splitting signal to generate electrical energy. The data processing module receives the second splitting signal to process data. Thus, the present invention can simultaneously harvest energy and process data.

Below, the embodiments are described in detail in cooperation with the drawings to make easily understood the technical contents, characteristics and accomplishments of the present invention.

DETAILED DESCRIPTION OF THE INVENTION

Figure 1:
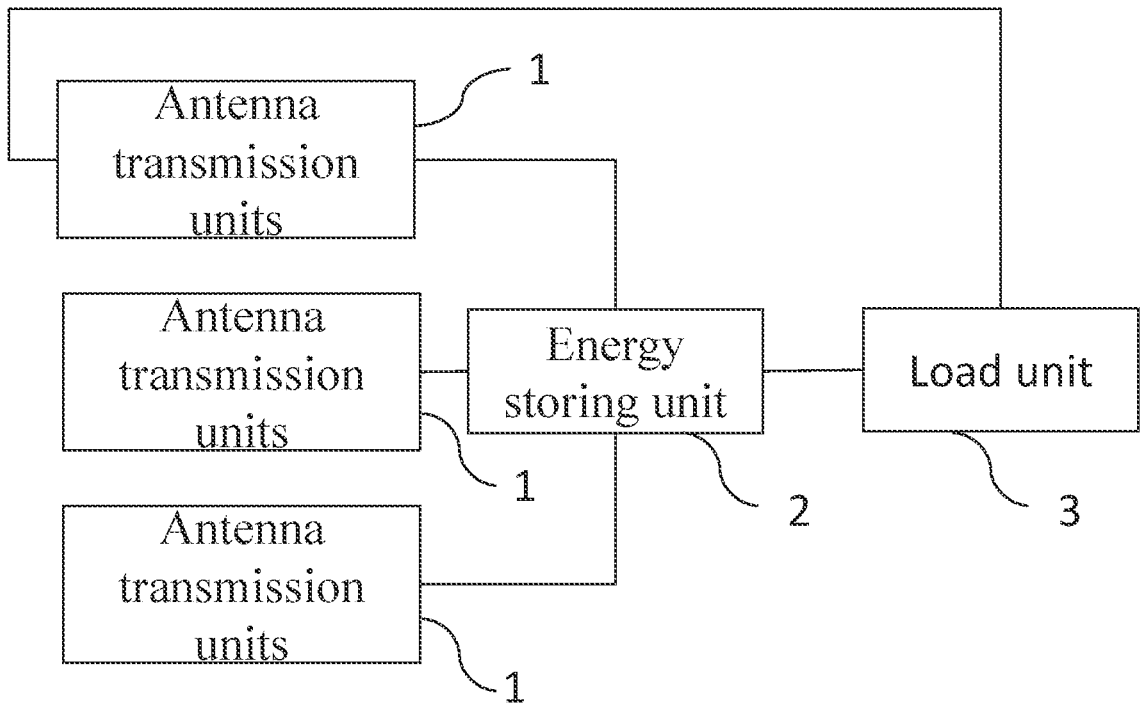
FIG. 1 is a schematic diagram illustrating a device according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Please refer to FIG. 1. The present invention provides a multi-antenna system for harvesting energy and transmitting data, which includes a plurality of antenna transmission units 1, an energy storing unit 2, and a load unit 3. The energy storing unit 2 is coupled to the antenna transmission units 1. The load unit 3 is coupled to one of the antenna transmission units 1. The energy storing unit 2 may be an energy storing capacitor or an electronic component with the same function, such as an electric double layer capacitor (EDLC). The load unit 3 is a battery-free e-paper tag or a battery-free electronic product with low power consumption like the battery-free e-paper tag. Electrical energy stored in the energy-storing capacitor is provided to the load unit 3 to use.

Figure 2:
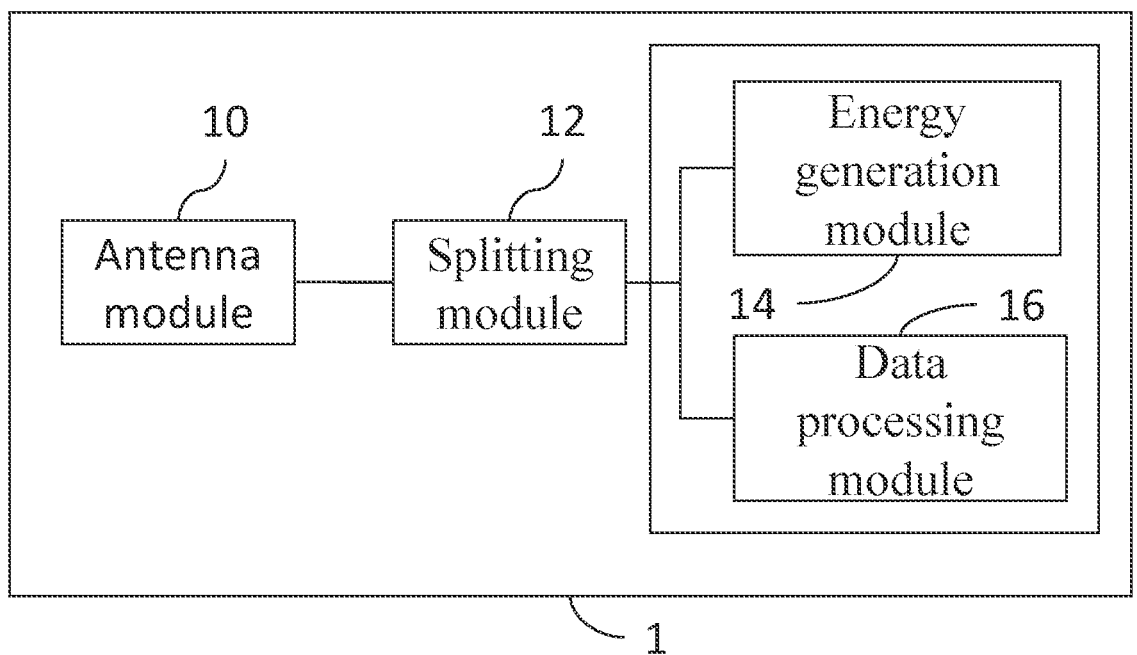
FIG. 2 is a schematic diagram illustrating an antenna transmission unit according to an embodiment of the present invention.

Please refer to FIG. 2. Each antenna transmission unit 1 includes an antenna module 10, a splitting module 12, an energy generation module 14, and a data processing module 16. Each antenna transmission unit 1 receives a wireless signal from a source terminal. The antenna module 10 is coupled to the splitting module 12. The splitting module 12 receives the wireless signal and splits the wireless signal into a first splitting signal and a second splitting signal. The energy generation module 14, coupled to the splitting module 12, receives the first splitting signal and converts the first splitting signal into electrical energy. The data processing module 16, coupled to the splitting module 12, receives the second splitting signal and converts it into a control signal. The load unit 3, coupled to one of the data processing modules 16, receives the control signal. The load unit 3 operates according to the control signal.

In an embodiment of the present invention, the splitting module 12 may be a balanced to unbalanced converter (abbreviated as a Balun). The balanced to unbalanced converter converts a single-ended transmission signal into differential transmission signals. As a result, the balanced to unbalanced converter can convert the wireless signal into the first splitting signal and the second splitting signal, wherein the first splitting signal and the second splitting signal have the same amplitudes, and phase difference between the first splitting signal and the second splitting signal is 180 degrees. The antenna module 10 is a single-frequency antenna or a multi-frequency antenna. The reception frequency band and the transmission frequency band of the antenna module 10 may be 3 MHz to 7.15 GHz, low-frequency bands, high-frequency bands, ultra-high frequency bands, or 2.4 G or 5 G frequency bands of Wi-Fi protocol. For example, the antenna module 10 is a single-frequency antenna that has a transmission frequency band of 860~960 MHz and a transmission distance of 2~10 m. Alternatively, the reception frequency band and the transmission frequency band of the antenna module range from 3 MHz to 7.15 GHz.

Figure 3:
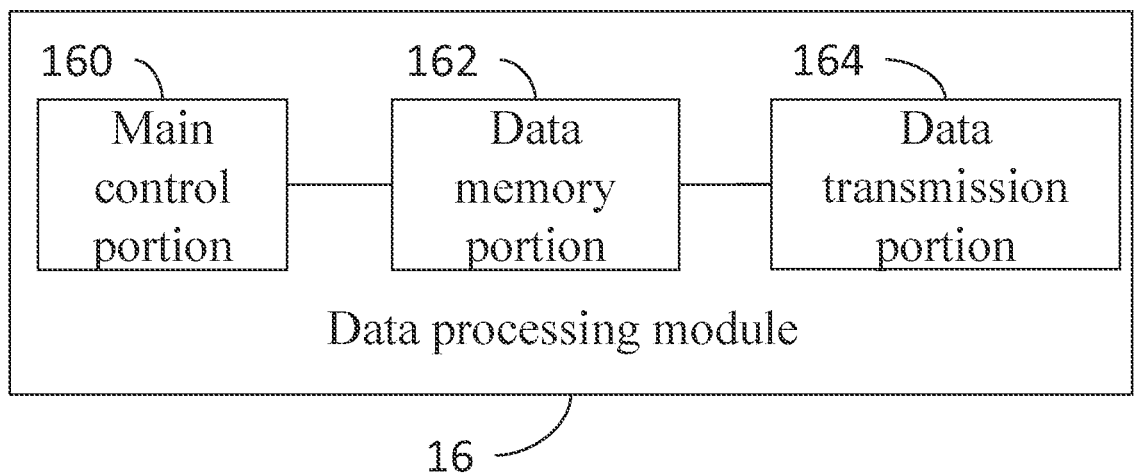
FIG. 3 is a schematic diagram illustrating a data processing module according to an embodiment of the present invention.

Please refer to FIG. 3. The data processing module 16 includes a main control portion 160, a data memory portion 162, and a data transmission portion 164. The main control portion 160, coupled to the splitting module 12 and the data memory portion 162, receives the second splitting signal and processes the second splitting signal to generate the control signal. The data transmission portion 164, coupled to the main control portion 160, receives the control signal. The load unit 3, coupled to one of the data transmission portions 164, receives the control signal and operates according to the control signal. The data memory portion 162 is configured to store data transmitted and processed by the main control portion 160 and the data transmission portion 164.

The data transmission portion 164 is a serial peripheral interface (SPI), an internal integrated circuit bus (I²C Bus) or a system management bus (SMBus). When the data transmission portion 164 is a SPI, the SPI transmits the control signal to the load unit 3 in the corresponding protocol.

Figure 4:
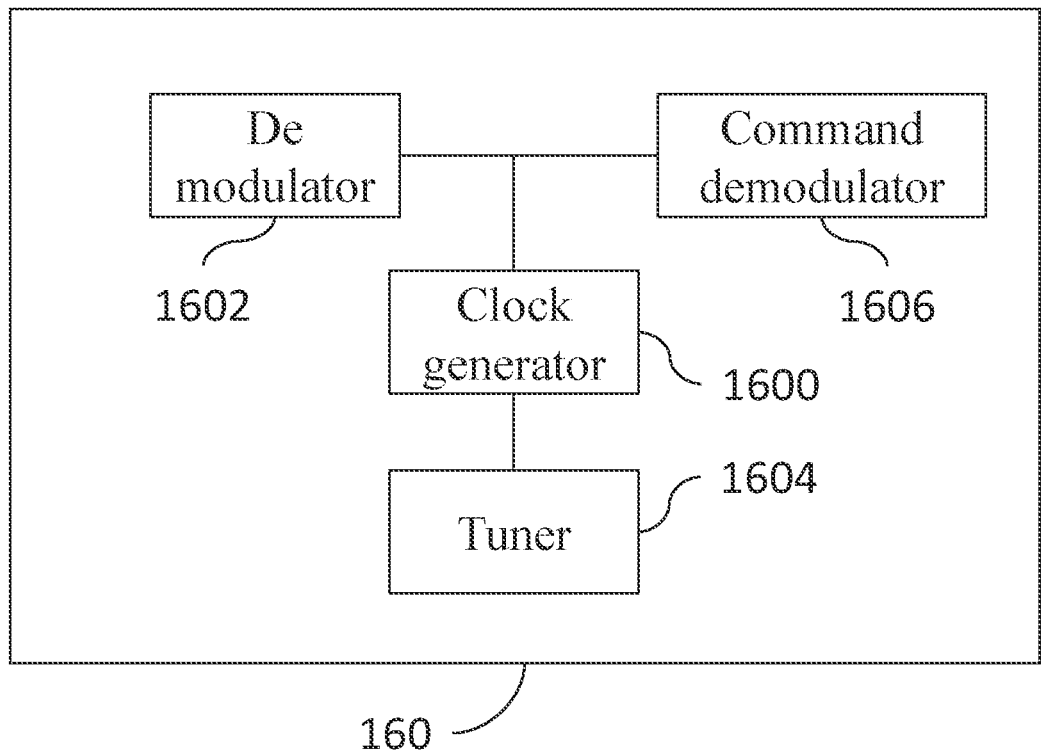
FIG. 4 is a schematic diagram illustrating a main control portion according to an embodiment of the present invention.

Please refer to FIG. 4. The main control portion 160 includes a clock generator 1600, a demodulator 1602, a tuner 1604, and a command decoder 1606. The clock generator 1600 generates a clock signal required by the components of the main control portion 160 that operates. The demodulator 1602 demodulates the second splitting module into a demodulation signal and transmits the demodulation signal to the command decoder 1606. The command decoder 1606 decodes the demodulation signal to generate a control command, processes the control command to generate the control signal, and transmits the control signal to the data transmission portion 164. In addition, the demodulator 1602 receives an output signal generated by the main control portion 160 and transmits the output signal to the splitting module 12. The splitting module 12 transmits the output signal to the antenna module 10, thereby transmitting the output signal to the source terminal.

Figure 5:
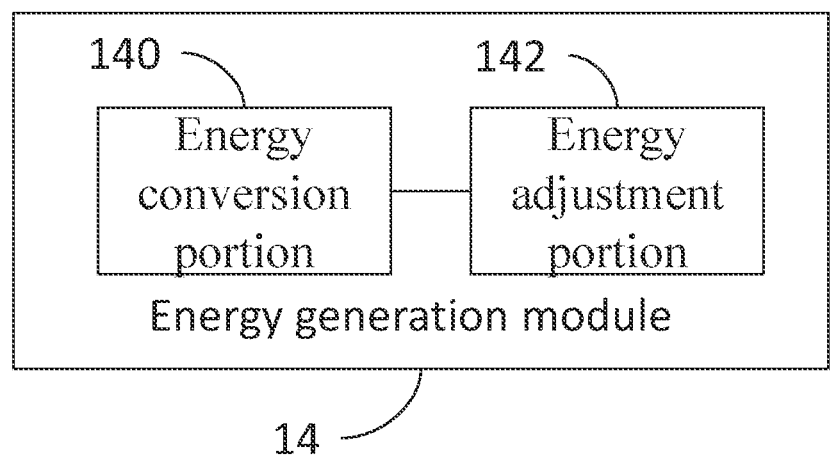
FIG. 5 is a schematic diagram illustrating an energy generation module according to an embodiment of the present invention.

Please refer to FIG. 5. The energy generation module 14 includes an energy conversion portion 140 and an energy adjustment portion 142. The energy conversion portion 140 is coupled to the energy adjustment portion 142. The energy conversion portion 140 coverts the first splitting signal into basic electrical energy. The energy adjustment portion 142 coverts the basic electrical energy into different voltages as select energy. Furthermore, the energy conversion portion 140 is a RF signal-to-DC voltage conversion circuit. The energy adjustment portion 142 is a DC voltage adjusting circuit. The energy adjustment portion 142 can generate DC voltages, such as 3.3 V, 1.8 V, and 1.2 V. The DC voltages are respectively transmitted to the different components of the present invention to use.

In conclusion, the conventional technology employs a single antenna to charge slowly and employs multiple antennas to respectively process data and harvest energy. However, the present invention can simultaneously harvest electrical energy and process data, such that the load unit can rapidly obtain sufficient power to process data, thereby overcoming the conventional problem. On top of that, the load unit 3 of the present invention merely is coupled to one of the antenna transmission units 1. However, the present invention is not limited to coupling the load unit 1 to one of the antenna transmission units 1 in implementation. The load unit 3 may be coupled to the plurality of antenna transmission units 1. In other words, the load unit 3 coupled to one or more antenna transmission units 1 is included within the scope of the present invention.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A multi-antenna system for harvesting energy and transmitting data comprising:
   an energy storing unit;
   a plurality of antenna transmission units coupled to the energy storing unit, wherein each of the plurality of antenna transmission units comprises:
      an antenna module configured to receive a wireless signal from a source terminal;
      a splitting module coupled to the antenna module and configured to receive the wireless signal and split the wireless signal into a first splitting signal and a second splitting signal;
      an energy generation module coupled to the splitting module, wherein the energy generation module is configured to receive the first splitting signal, convert the first splitting signal into electrical energy, and transmit the electrical energy to the energy storing unit to store the electrical energy in the energy storing unit; and a data processing module coupled to the splitting module and the energy generation module and configured to receive the electrical energy and to receive the second splitting signal, wherein the data processing module is configured to convert the second splitting signal into a control signal; and a load unit coupled to the energy storing unit and the corresponding data processing module of one of the plurality of antenna transmission units and configured to harvest the electrical energy from the energy storing unit and receive the control signal from the corresponding data processing module, wherein the load unit is configured to operate according to the control signal;

wherein the data processing module comprises:
a main control portion coupled to splitting module and configured to the second splitting signal, wherein the main control portion is configured to process the second splitting signal to generate the control signal;
a data transmission portion coupled to the main control portion and configured to receive the control signal; and
a data memory portion coupled to the main control portion and the data transmission portion and configured to store data transmitted and processed by the main control portion and the data transmission portion;
wherein the load unit is coupled to the data transmission portion of the corresponding data processing module;
wherein the main control portion comprises:
a demodulator coupled to the splitting module and configured to receive the second splitting module, wherein the demodulator is configured to demodulate the second splitting module into a demodulation signal;
a tuner coupled to the data transmission portion, wherein the demodulator is configured to receive output data outputted by the data transmission portion, tune the output data into an output signal and transmit the output signal to the splitting module, and the splitting module is configured to transmit the output signal to the antenna module, thereby transmitting the output signal to the source terminal;
a command decoder coupled to demodulator and configured to receive the demodulation signal, wherein the command decoder is configured to decode the demodulation signal to generate a control command, process the control command to generate the control signal, and transmit the control signal to the data transmission portion; and
a clock generator coupled to the demodulator, the tuner, and the command decoder and configured to generate a clock signal required by the demodulator, the tuner, and the command decoder.

2. The multi-antenna system for harvesting energy and transmitting data according to claim 1, wherein the energy generation module comprises:
an energy conversion portion configured to covert the first splitting signal into basic electrical energy; and
an energy adjustment portion coupled to the energy conversion portion and configured to covert the basic electrical energy into different voltages as select energy.

3. The multi-antenna system for harvesting energy and transmitting data according to claim 1, wherein the data transmission portion is a serial peripheral interface, an internal integrated circuit bus, or a system management bus.

4. The multi-antenna system for harvesting energy and transmitting data according to claim 1, wherein the splitting module is a balanced to unbalanced converter.

5. The multi-antenna system for harvesting energy and transmitting data according to claim 1, wherein the antenna module is a single-frequency antenna or a multi-frequency antenna.

6. The multi-antenna system for harvesting energy and transmitting data according to claim 1, wherein a reception frequency band and a transmission frequency band of the antenna module range from 3 MHz to 7.15 GHz.

7. The multi-antenna system for harvesting energy and transmitting data according to claim 1, wherein the energy storing unit is an energy storing capacitor.

8. The multi-antenna system for harvesting energy and transmitting data according to claim 1, wherein the load unit is a battery-free e-paper label.

\* \* \* \* \*